US010451277B2

(12) United States Patent
Chandler et al.

(10) Patent No.: US 10,451,277 B2
(45) Date of Patent: Oct. 22, 2019

(54) LINER ELEMENT FOR A COMBUSTOR, AND A RELATED METHOD

(71) Applicant: ROLLS-ROYCE PLC, London (GB)

(72) Inventors: Paul Ian Chandler, Sutton Coldfield (GB); Anthony Pidcock, Derby (GB)

(73) Assignee: ROLLS-ROYCE plc, London (GB)

( * ) Notice: Subject to any disclaimer, the term of this patent is extended or adjusted under 35 U.S.C. 154(b) by 993 days.

(21) Appl. No.: 14/860,051

(22) Filed: Sep. 21, 2015

(65) Prior Publication Data

US 2016/0102860 A1   Apr. 14, 2016

(30) Foreign Application Priority Data

Oct. 13, 2014 (GB) .................................. 1418042.6

(51) Int. Cl.
*F23R 3/60* (2006.01)
*F23R 3/00* (2006.01)
(Continued)

(52) U.S. Cl.
CPC ................ *F23R 3/002* (2013.01); *B05D 3/12* (2013.01); *F02C 7/20* (2013.01); *F23R 3/16* (2013.01);
(Continued)

(58) Field of Classification Search
CPC ............... F23R 3/002; F23R 3/60; F02C 7/20
See application file for complete search history.

(56) References Cited

U.S. PATENT DOCUMENTS 4,512,159 A * 4/1985 Memmen .................. F23R 3/60
60/752
4,848,089 A * 7/1989 Cramer ..................... F23R 3/60
60/752
(Continued)

FOREIGN PATENT DOCUMENTS

EP        0741268 A1   11/1996
EP        1 413 831 A1    4/2004
(Continued)

OTHER PUBLICATIONS

Mar. 9, 2015 Search Report issued in British Patent Application No. 1418042.6.
(Continued)

*Primary Examiner* — Gerald L Sung
*Assistant Examiner* — Marc J Amar
(74) *Attorney, Agent, or Firm* — Oliff PLC (57) ABSTRACT

A liner element for a gas turbine combustor having a structural wall with fixing apertures provided therethrough. The liner element has a unitary construction defining a cooling side and combustion side, and a plurality of effusion holes extending between a cooling side surface of the element and a combustion side surface of the element. The liner element is configured to be affixed to the structural wall of a combustor with its cooling side surface spaced from the wall to define a chamber between the cooling side surface and the wall, and the liner element further includes integrally formed and non-threaded protuberances on its cooling side, the protuberances being arranged to engage and extend through respective fixing apertures in the combustor wall. Also disclosed is a method of thermally insulating the liner element.

17 Claims, 5 Drawing Sheets

(51) Int. Cl.
*F02C 7/20* (2006.01)
*F23R 3/50* (2006.01)
*B05D 3/12* (2006.01)
*F23R 3/16* (2006.01)

(52) U.S. Cl.
CPC .................. *F23R 3/50* (2013.01); *F23R 3/60* (2013.01); *F23R 2900/00018* (2013.01); *F23R 2900/03041* (2013.01); *F23R 2900/03044* (2013.01)

(56) References Cited

U.S. PATENT DOCUMENTS

| | | | | |
|---|---|---|---|---|
| 5,113,660 | A * | 5/1992 | Able | F23R 3/002 110/339 |
| 5,435,139 | A | 7/1995 | Pidcock et al. | |
| 5,501,071 | A * | 3/1996 | Ansart | F02K 1/822 60/800 |
| 6,004,620 | A * | 12/1999 | Camm | B23P 6/002 427/142 |
| 6,265,022 | B1 * | 7/2001 | Fernihough | F01D 5/28 427/142 |
| 6,620,457 | B2 * | 9/2003 | Farmer | C23C 4/00 427/235 |
| 6,663,919 | B2 * | 12/2003 | Farmer | B23P 6/002 29/889.1 |
| 6,955,053 | B1 | 10/2005 | Chen et al. | |
| 7,192,622 | B2 * | 3/2007 | Fernihough | C23C 8/04 427/157 |
| 7,622,160 | B2 * | 11/2009 | Gupta | C23C 4/073 427/446 |
| 8,262,802 | B2 | 9/2012 | Garry et al. | |
| 2002/0124572 | A1 * | 9/2002 | Pidcock | F23R 3/002 60/796 |
| 2003/0101731 | A1 * | 6/2003 | Burd | F23M 5/02 60/796 |
| 2003/0213250 | A1 * | 11/2003 | Pacheco-Tougas | F23R 3/002 60/752 |
| 2004/0074239 | A1 * | 4/2004 | Tiemann | F23R 3/002 60/798 |
| 2006/0005543 | A1 * | 1/2006 | Burd | F23M 5/085 60/752 |
| 2007/0169484 | A1 | 7/2007 | Schumacher et al. | |
| 2008/0264065 | A1 * | 10/2008 | Gerendas | F23R 3/002 60/754 |
| 2010/0170257 | A1 | 7/2010 | Chila et al. | |
| 2011/0030378 | A1 * | 2/2011 | Carlisle | F23R 3/002 60/753 |
| 2016/0356500 | A1 * | 12/2016 | Bouldin | F23R 3/002 |

FOREIGN PATENT DOCUMENTS

| | | | |
|---|---|---|---|
| EP | 1983265 A2 | 10/2008 | |
| GB | 2 087 065 A | 5/1982 | |
| GB | 2087065 A * | 5/1982 | ............. F23R 3/002 |
| GB | 2 285 477 A | 7/1995 | |

OTHER PUBLICATIONS

Feb. 4, 2016 Search Report issued in European Patent Application No. 15186005.

Apr. 17, 2019 Office Action issued in European Patent Application No. 15 186 005.3.

* cited by examiner

LINER ELEMENT FOR A COMBUSTOR, AND A RELATED METHOD

TECHNICAL FIELD

The present invention relates to a liner element for a gas turbine combustor, and to a method of thermally insulating such a liner element.

BACKGROUND OF THE INVENTION AND PRIOR ART

The combustion process which takes place within the combustor of a gas turbine engine results in the combustor walls being exposed to extremely high temperatures. The alloys which are typically used in combustor wall construction are normally unable to withstand these temperatures without some form of cooling arrangement. It is therefore known to make use of pressurised air derived from the engine's compressor for cooling purposes within the combustor.

One way of cooling the combustor wall with compressor air in this manner involves the provision of a double wall combustor construction having a continuous outer wall and an inner wall made up of a number of separate and replaceable wall elements in the form of tiles which are affixed to the outer wall in a tessellated manner. The inner wall tiles are each configured to be affixed to the outer wall of the combustor so as to define a chamber between a cooling side surface of the tile and the outer wall. The outer wall is provided with a number of feed holes through which cooling air drawn from the engine's compressor is directed so as to pass into the chambers defined between each inner tile and the outer wall, for impingement on the aforementioned cooling side surface of the inner tile, thereby providing impingement cooling to the inner tile. The inner tiles are each furthermore provided with a plurality of so-called effusion holes which define flow passages through the tiles from their cooling side surfaces to oppositely directed combustion side surfaces which face the interior of the combustor where combustion will take place during operation of the engine. The cooling air which is directed into the chambers and which impinges on the cooling side surface of the tiles is thus exhausted through the effusion holes and in doing so provides convective heat removal from the tiles. The air subsequently forms a thin film of air over the tiles' combustion side surfaces which helps to protect the tiles from the combustion flame inside the combustor. In order to aid the formation of this thin film of air, the effusion holes are often inclined relative to the combustion side surface. Combustor wall arrangements of the type described above thus provide both impingement and effusion cooling of the combustor wall construction, and the tiles are sometimes referred to as impingement/effusion ("IE") tiles.

U.S. Pat. No. 5,435,139 describes a tile system of the general type described above. This document also shows how the tiles are typically affixed to the outer wall of the combustor. Each tile has a number of integrally-formed threaded studs which protrude outwardly from the cold side of the tile and which are received through respective apertures formed in the outer wall of the combustor and engaged by respective self-locking nuts on the outer side of the outer wall.

Tiles of the type described above are typically formed from a nickel based alloy, and have their combustion side surfaces protected by a thermal barrier coating to insulate the tile and thereby maintain the temperature of the metal within acceptable levels.

The thermal barrier coating is usually applied in two parts: an initial bond coat (such as a CoNiCrAly composition); and a thermally insulating top coat which may comprise Yttria Partially Stabilised Zirconia ("PYSZ") and which is applied over the bond coat. The bond coat is applied directly to the metal of the tiles, for example by air plasma spray, to ensure adherence of the subsequent top coat. The bond coat may typically have a thickness of between 0.05 mm and 0.2 mm, whilst the top coat usually has a thickness of between 0.1 mm and 0.5 mm.

As will be appreciated, it is important for proper functioning of the tiles that their effusion holes are not blocked by the application of the thermal barrier coating. This represents a significant technical challenge, and various processes have been proposed in the prior art to prevent effusion hole blockage.

One such process, known as a so-called "coat-drill" process involves applying the thermal barrier coat to the combustion side surface of a tile, and then subsequently forming the effusion holes through both the alloy of the tile and the coating. This usually involves forming the holes either by mechanical drilling or by laser from the combustion side, firstly through the thermal barrier coating and then through the metal of the tile. Although this process is relatively simple, in the case of laser-cutting the effusion holes the laser must be operated at reduced power to avoid excessive damage to the brittle ceramic thermal barrier coating. Reducing the power of the cutting laser increases the cycle time necessary to form the holes which can significantly increase the production cost of the tiles. Furthermore, forming the effusion holes through the thermal barrier coating can cause cracking and delamination in the coating which can lead to premature loss of the coating during service, resulting in potential thermal damage to the tiles.

Alternatively, it is possible to form the effusion holes through the tile before the thermal barrier coating is then applied. This process, known as a so-called "drill-coat" process, is also relatively simple and has the benefit of allowing full-power operation of a cutting laser to form the effusion holes. However an inevitable consequence of this process is that some or all of the effusion holes then become either partially or completely blocked by the thermal barrier coating when it is applied. These blockages reduce the effective flow area of the tile and thus have a deleterious effect on convective heat removal within the effusion holes and the formation of a cooling film of air across the combustion side surface of the tile during service.

It is therefore considered preferable to use a so-called "drill-coat-clean" process, which is basically similar to the "drill-coat" process but which includes a subsequent cleaning process effective to clean the effusion holes to remove any coating material blocking the effusion holes. This cleaning step can be done via the use of a high pressure water or air jet, which may contain abrasive particles, and which is directed towards and through the holes to blast out any coating material therefrom. The water or air jet is usually directed towards the effusion holes from the cooling side of the tile. U.S. Pat. No. 8,262,802 discloses this type of technique.

A cleaning step of the type described above, carried out either after the entire thickness of the thermal barrier coating has been applied or as an intermediate step carried out after the initial bonding layer has been applied, has been found to provide clean effusion holes with slightly rounded edges. Also, the thermal barrier coating remains free from cracks and delamination which can arise via use of a laser to cut the holes after application of the coating.

Figure 1:
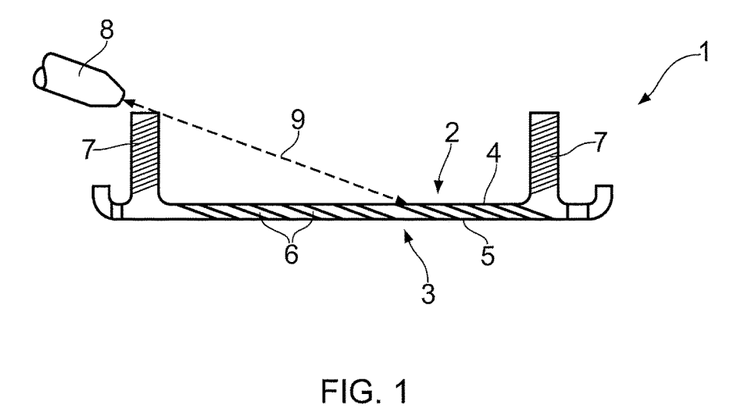
FIG. 1 (discussed above) is a schematic cross-sectional view through a prior art combustor liner element, showing a cleaning step used to clean the element's effusion holes.

However, in the specific context of a combustor liner tile, it can be difficult to direct the cleaning jet properly at all of the effusion holes because of obstruction by the attachment studs which project outwardly from the cold side of the tile. This problem is illustrated schematically in FIG. 1 which shows an IE tile 1 having a cooling side 2 and a combustion side 3. The cooling side 2 of the tile defines a cooling side surface 4, and the combustion side 3 of the tile defines a combustion side surface 5 which in use will be directed to the region of a combustor in which combustion will take place. The effusion holes 6 can be seen to extend between the cooling side surface 4 and the combustion side surface 5 at an inclined angle to the combustion side surface 5. FIG. 1 also illustrates a pair of externally threaded attachment studs 7 of the type described above in the prior art, which protrude from the cooling side 2 of the tile for receipt through respective apertures formed in the outer wall of a combustor (not shown). As will be appreciated, the attachment studs must have sufficient length to extend across the cavity which will be formed between the cooling side surface 4 of the tile and the outer wall of the combustor, and then project through the apertures in the outer wall by a sufficient degree to engage a threaded nut. A typical IE tile may have up to eight attachment studs 7 of this type, provided in spaced-apart relation to one another over the cooling side of the tile.

FIG. 1 also shows a cleaning nozzle 8 which is used to direct a jet of cleaning water or air towards the effusion holes 6 as illustrated, in order to clean the effusion holes of any coating material that may collect therein during the step of applying a thermal barrier coating to the combustion side surface 5 as described above. The nozzle 8 is positioned to direct a jet along a jet axis 9 towards each effusion hole 6, the jet axis 9 being inclined relative to the combustion side surface 5 by the same angle as the effusion holes so that the jet is directed through the holes. The nozzle 8 may be moved across the cooling side of the tile 1, for example in a scanning manner, to direct its cleaning jet though successive effusion holes.

However, it has been found that the length of the attachment studs 7, which can typically be approximately 15 mm, obstructs the nozzle 8 and can therefore prevent effective cleaning of the effusion holes 6. In order to clean the effusion holes effectively it has been found that the nozzle 8 should be spaced from the cooling side surface 4 by a distance of approximately 30 mm or less, as measured along the jet axis 9. The length of the attachment studs 7 precludes this because clashes occur between the nozzle 8 and the studs 7 as the nozzle is moved across the cooling side 2 of the tile at a range of anything less than 50 mm measured along the jet axis 9. Also the length of the studs 7 can also preclude the jet being properly directed towards several effusion holes proximate to each stud, those holes thus effectively sitting in the "shadow" of the studs.

Another problem which arises from the prior art configuration of the attachment studs 7 is that they represent a limiting factor in the efficiency with which the IE tiles can be manufactured by a Direct Laser Deposition ("DLD") technique. DLD is a type of additive layer manufacturing technique which is considered to be advantageous for the production of IE tiles from their base alloy because it allows all features of the tiles, including the effusion holes and the attachment studs, to be formed integrally in a single process. In order to maximise the number of tiles which can be produced simultaneously via a DLD process it is optimal to form the tiles in a vertically stacked array on the DLD machine bed. However, it has been found that this orientation often produces an unacceptable quality of threads on the attachment studs of the tiles. Improved threads can be obtained by forming the tiles in a horizontally arranged array, but in this orientation the number of tiles which can be formed simultaneously in any given DLD machine is significantly reduced, which thus increases the production cost per tile.

SUMMARY OF THE INVENTION

According to the present invention, there is provided a liner element for a gas turbine combustor having a structural wall with fixing apertures provided therethrough, the liner element having a unitary construction defining a cooling side and combustion side, and a plurality of effusion holes extending between a cooling side surface of the element and a combustion side surface of the element; the liner element being configured to be affixed to the structural wall of a combustor with its cooling side surface spaced from the wall to define a chamber between the cooling side surface and the wall and having a peripheral flange configured to engage said wall of the combustor when the liner element is affixed thereto, wherein the liner element further includes integrally formed and non-threaded protuberances on its cooling side, the protuberances being arranged to engage and extend through respective fixing apertures in the combustor wall and at least some of said protuberances projecting from said flange.

Conveniently, each protuberance is provided in the form of a lug projecting from the cooling side of the liner element.

Advantageously, said protuberances projecting from the flange protrude by a distance of between 2 mm and 8 mm.

Conveniently, said protuberances projecting from the flange protrude by a distance of approximately 5 mm.

Optionally, the liner element has at least one centrally located web projecting from said cooling side surface, the or each said web supporting a said protuberance.

Preferably, said effusion holes define respective flow channels through the liner element having respective axes which are inclined relative to said combustion side surface.

Advantageously, some of said effusion holes are proximate to said protuberances and are larger than other effusion holes which are distal to said protuberances.

Conveniently, the liner element is provided in combination with a plurality of fixing elements, wherein the protuberances and the fixing elements are configured such that each fixing element mechanically engages a respective protuberance in an interlocking manner.

Preferably, each fixing element defines a recess which is shaped to slidingly receive a correspondingly shaped part of a respective protuberance.

Advantageously, each fixing element has an integrally formed threaded stud extending therefrom.

Conveniently, each fixing element is of a size which will not pass through said fixing apertures.

The liner element may be provided in combination with a gas turbine combustor having a structural wall with fixing apertures provided therethrough, wherein the liner element is affixed to the structural wall of the combustor using said fixing elements such that each protuberance extends through a respective fixing aperture in the combustor wall from one side of the combustor wall and is mechanically engaged by a respective fixing element arranged on the opposite side of the combustor wall.

Advantageously, the arrangement further comprises a plurality of clamping elements, each clamping element being fitted over a respective fixing element and being urged towards the structural wall by a nut which threadedly engages the threaded stud of the fixing element.

According to a second aspect of the present invention, there is provided a method of thermally insulating a liner element according to the first aspect, the method involving the steps of: coating the combustion side surface of the liner element with a thermal barrier material; and subsequently cleaning the effusion holes to remove any of said material deposited inside the holes during said coating step; wherein said cleaning step involves directing a jet along a jet axis and through said effusion holes from the cooling side of the liner element, said jet being produced by a nozzle which is moved across the cooling side of the liner element in spaced relation to the cooling side surface whilst the distance of said nozzle to said cooling side surface, measured along said jet axis, is maintained at less than or equal to 30 mm.

Conveniently, said jet axis is substantially parallel to said axes of the flow channels defined by the effusion holes.

Advantageously, said cleaning step involves moving said nozzle over at least one said protuberance, the or each protuberance being sized so as not to interfere with the movement of the nozzle.

BRIEF DESCRIPTION OF THE DRAWINGS

So that the invention may be more readily understood, and so that further features thereof may be appreciated, embodiments of the invention will now be described by way of example with reference to the accompanying drawings in which.

DETAILED DESCRIPTION OF EMBODIMENTS OF THE INVENTION

Figure 2:
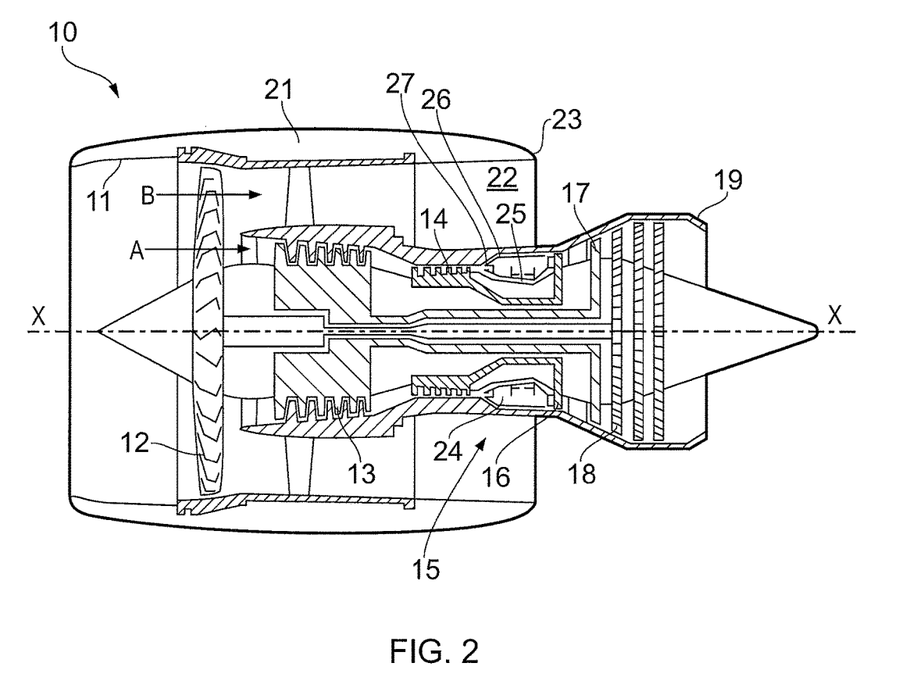
FIG. 2 is a schematic longitudinal cross-sectional view through a gas turbine engine of a type in which the present invention may be provided.

Turning now to consider FIGS. 2 to 9 of the drawings in more detail, FIG. 2 shows a ducted fan gas turbine engine 10 which incorporates the invention and has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, an intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

During operation, air entering the intake 11 is accelerated by the fan 12 to produce two air flows: a first air flow A into the intermediate pressure compressor 13 and a second air flow B which passes through the bypass duct 22 to provide propulsive thrust. The intermediate pressure compressor 13 compresses the air flow A directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate pressure compressors 14, 13 and the fan 12 by suitable interconnecting shafts.

The combustion equipment 15 comprises an annular combustor 24 having radially inner and outer walls 25, 26 respectively. Fuel is directed into the combustor 24 through a number of fuel nozzles located at the upstream end 27 of the combustor. The fuel nozzles are circumferentially spaced around the engine 10 and serve to spray fuel into air derived from the high pressure compressor 14. The resultant fuel/air mixture is then combusted within the combustor 24.

The combustion process which takes place within the combustor 24 naturally generates a large amount of heat energy. It is therefore necessary to arrange that the inner and outer wall structures 25, 26 are capable of withstanding this heat while functioning in a normal manner.

Figure 3:
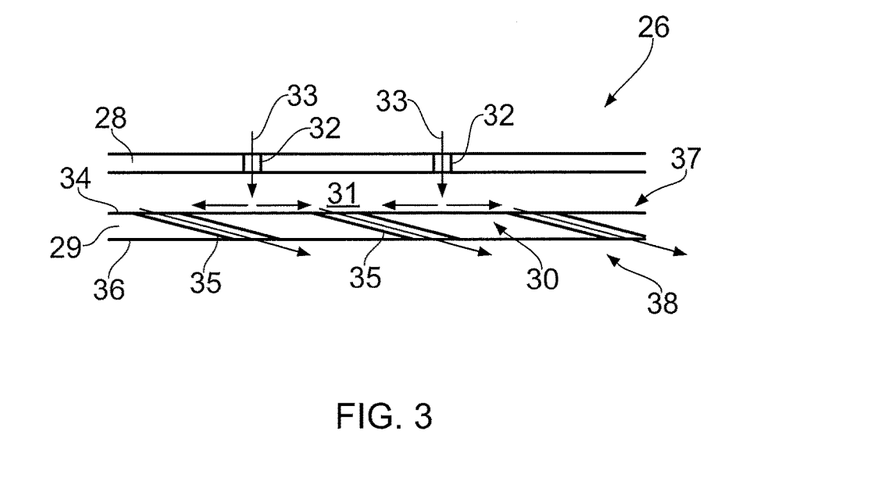
FIG. 3 is a cross-sectional view through part of the engine's combustor, the combustor having a liner element in accordance with the present invention.

A region of the radially outer wall structure 26 is shown in more detail in FIG. 3. It is to be appreciated, however, that the radially inner wall structure 25 is of the same general configuration as the radially outer wall structure 26.

Figure 4:
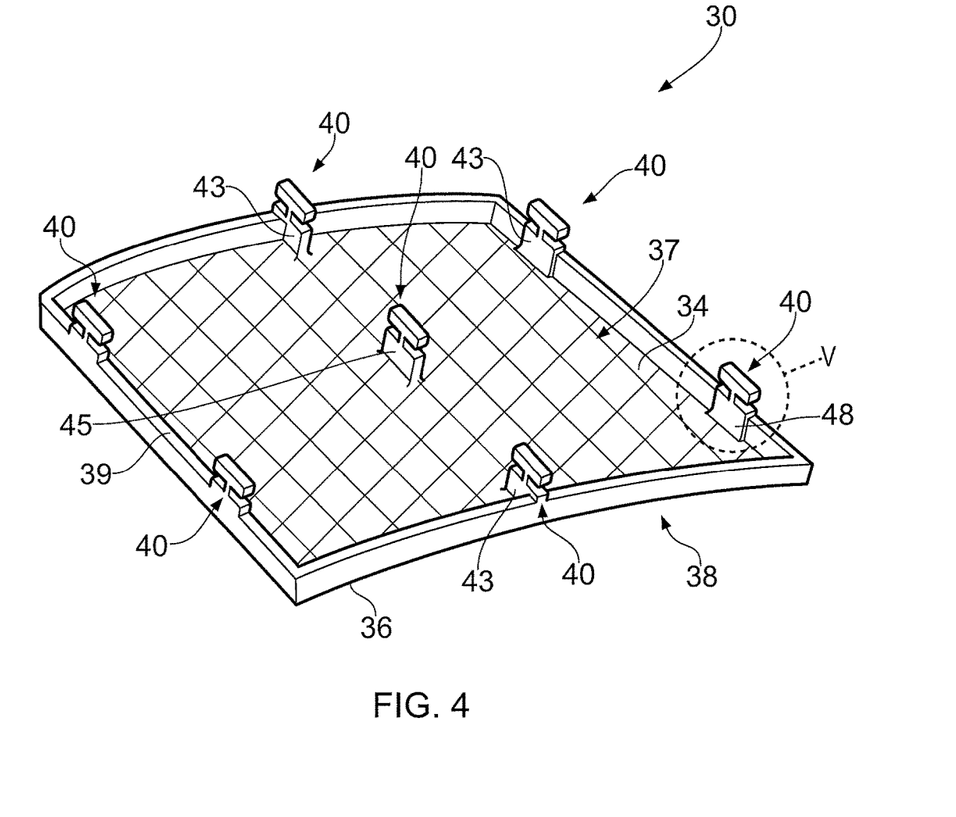
FIG. 4 is a perspective view of a liner element in accordance with the present invention, as viewed from the cooling side of the element.

Referring to FIG. 3, the radially outer wall structure 26 comprises an outer structural wall 28 and an inner wall 29. As will become apparent hereinafter, the inner wall 29 is formed from a plurality of liner elements 30, one of which is illustrated in FIG. 4, which are affixed to the outer wall 28 so as to lie adjacent one another in a tessellated manner. The liner elements 30 making up the inner wall thus each define a respective tile and collectively define a liner to the outer structural wall 28 of the combustor 24. As will become apparent, and as shown in FIG. 3, the major extent of each liner element 30 is spaced from the outer wall 28 to define a chamber 31 between the outer wall 28 and each liner element 30 in the manner of a conventional IE tile of the type described in the introduction above.

During engine operation, some of the air exhausted from the high pressure compressor 14 is permitted to flow over the exterior surfaces of the combustor 24 to provide combustor cooling, whilst some is directed into the combustor to assist in the combustion process. A large number of feed holes 32 are provided through the outer wall 28 as shown in FIG. 3, to permit the flow (illustrated schematically by arrows 33 in FIG. 3) of some of this compressor air into the chambers 31. As illustrated in FIG. 3, the air passing through the holes 32 impinges upon the radially outward surfaces 34 of the liner elements 30. This impingement of the compressor air serves to cool the liner elements 30.

The air is then exhausted from the chambers 31 though a plurality of angled effusion holes 35 provided through each liner element 30. The effusion holes 35 thus define respective flow channels through the liner element 30 having respective axes which are inclined relative to the radially outward surface 34. The effusion holes 35 are so angled as to be aligned in a generally downstream direction with regard to the general fluid flow direction through the combustor. The air exhausted from the effusion holes 35 forms a film of cooling air over the radially inward surface 36 of each liner element 30, which is the surface confronting the combustion process which takes place within the combustor 24. This film of cooling air assists in protecting the liner elements 30 from the effects of the high temperature gases within the combustor 24.

As will thus be appreciated, each liner element 30 effectively has a radially outward cooling side, indicated generally at 37 in FIG. 3, and a radially inward combustion side, indicated generally at 38 in FIG. 3. The radially outward surface 34 of each liner element, on its cooling side, can thus be considered to represent a cooling side surface. Similarly, the radially inward surface 36 of each liner element, on its combustion side, can thus be considered to represent a combustion side surface.

Turning now to consider FIG. 4, there is shown a complete liner element 30 in the form of an IE tile. The liner element 30 is illustrated as viewed from its cooling side 37, with its oppositely directed combustion side 38 facing downwardly in the orientation shown. The major extent of the liner element, in which the effusion holes 35 are provided, is shown cross-hatched in FIG. 4, the individual effusion holes not actually being shown. As will therefore be appreciated, the cooling side surface 34 is shown facing upwardly, and the combustion side surface 36 faces downwardly and so is not visible in FIG. 4.

The liner element 30 is formed from a suitable metal such as a superalloy. Suitable metals for the liner element 30 include nickel-based superalloy, cobalt-based superalloy and iron-based superalloy. The liner element 30 is preferably formed as a unitary, one-piece, construction via either a casting process or an additive layer manufacturing technique such as direct laser deposition. In the case of the liner element 30 being cast, then it envisaged that the effusion holes 35 will be formed after the casting process, for example by a laser cutting technique. In the event that the liner element 30 is formed by an additive layer manufacturing technique, then the effusion holes 35 can be formed simultaneously with the rest of the liner element as it is built up.

The liner element 30 has an integrally formed peripheral flange 39, which extends radially in the orientation illustrated in FIG. 4, away from the cooling side 37 of the liner element 30.

The flange 39 is configured to engage the outer wall 28 of the combustor 24 when the liner element 30 is affixed to the outer wall, and thereby serves to define the perimeter of the chamber 31 defined between the outer wall 28 and the liner element 30 and to space the cooling side surface 34 from the outer wall 28 in the manner illustrated in FIG. 3.

At positions spaced around the peripheral flange 39 the flange supports respective integrally formed protuberances 40 which extend radially away from the cooling side surface 34 of the liner element and thus project from the cooling side 37 of the liner element. Each protuberance 40 comprises a small lug 41 which is supported by a short post 42 extending radially outwardly from a buttress 43 formed integrally with the flange 39 in the region of the protuberance 40, as illustrated in more detail in FIG. 5.

Figure 5:
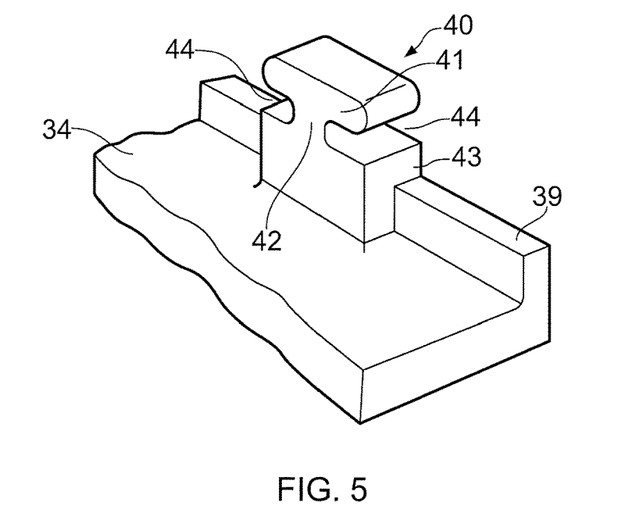
FIG. 5 is an enlarged perspective view showing the region of the liner element denoted V in FIG. 4.

As will be noted, the lug 41 of each protuberance is somewhat larger in a direction parallel to the local region of the flange 39 than its supporting post 42, and so a pair of re-entrant recesses 44 are thus defined in each protuberance, between the lug 41 and its corresponding buttress 43.

Also shown in FIG. 4 is a centrally located protuberance 40 of generally identical form to the above-described peripheral ones, and which extends rearwardly from a central region of the cooling side 37 of the liner element 30. This non-peripheral and centrally located protuberance 40 is supported by a web 45, which protrudes from the cooling side surface 34, rather than by a buttress 43 of the type which support the peripheral protuberances around the flange 39. Nevertheless, the supporting post 42 and the lug 41 are of similar configuration to that described above, and so re-entrant recesses 44 are defined between the lug 41 and the web 45. It is to be appreciated that whilst the particular liner element illustrated in FIG. 4 has only one non-peripheral protuberance 40 of this type, it is possible for a liner element to have more than one such protuberance 40.

Figure 6:
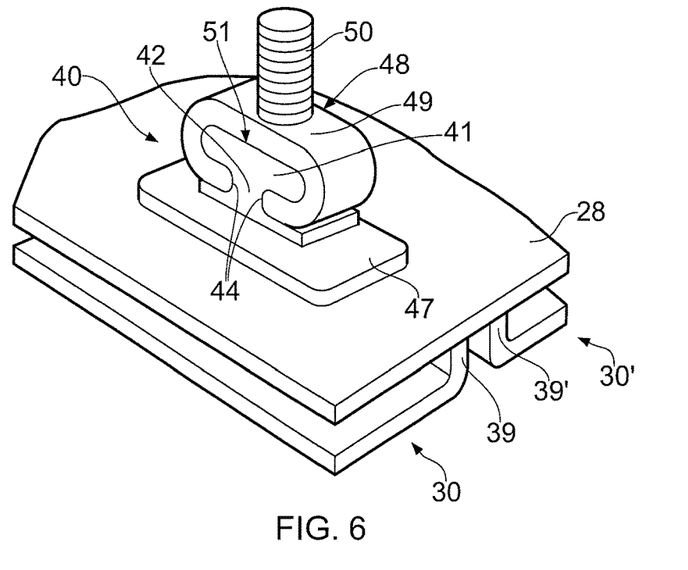
FIG. 6 is a perspective view generally similar to that of FIG. 5, but which shows the region of the liner element in combination with a corresponding region of the outer wall of a combustor.
Figure 7:
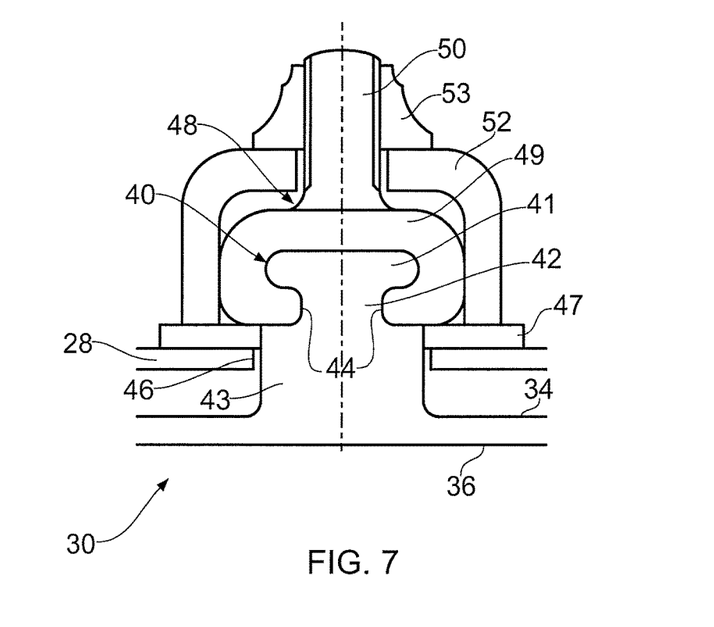
FIG. 7 is a cross-sectional view showing the arrangement in combination with other fixing components.

FIGS. 6 and 7 show part of the liner element 30, in the region of one of its peripheral protuberances 40 and a neighbouring liner element 30', in combination with the outer structural wall 28 of the combustor 24, and more particularly illustrate the function of the protuberances 40 in attaching the liner elements 30 to the outer wall 28. Additional fixing parts are also illustrated, as will be described in more detail below. As will be noted, each protuberance 40 is arranged and configured to engage the outer wall 28, and more particularly to engage and extend through a respective fixing aperture 46 (not visible in FIG. 6) provided through the outer wall 28.

In order to affix a liner element 30 to the outer wall 28 of the combustor 24, the liner element 30 is offered up to the radially inward side of the outer wall 28, with its protuberances 40 aligned with respective fixing apertures 46. The protuberances 40 are then inserted through the fixing apertures 46 and the liner element 30 is pressed towards the outer wall 28 such that its lugs 41 all pass completely through respective fixing apertures 46, until its peripheral flange 39 engages the radially inward surface of the outer wall 28. Similarly each web 45, from which a centrally located protuberance 40 projects, also engages the radially inward surface of the outer wall 28. In this position the supporting posts 42 of each protuberance are received within respective fixing apertures 46 and protrude slightly from the opposite side, whilst the lug 41 of each protuberance become spaced from the outer wall 28. A sealing washer 47 may then be fitted over each protuberance 40, from the radially outward side of the combustor wall 28. As will be noted, each sealing washer 47 has a generally rectangular central aperture which is sized to pass freely over the lug 41 of a respective protuberance 40, and which then fits closely around the protruding region of the corresponding supporting post 42.

After a sealing washer 47 has been installed over each protuberance 40 in the manner described above, a separate fixing element 48 is then mechanically engaged with the protuberance 40. Each fixing element 48 is formed as a unitary, one-piece, component (for example by casting, forging, metal injection moulding, or a DLD process), and comprises a generally C-shaped saddle region 49 from which extends an externally threaded stud 50. As illustrated most clearly in FIG. 6, the saddle region 49 of each fixing element 48 defines a recess 51 which is shaped to slidingly receive the correspondingly shaped lug 41 of a respective protuberance 40 such that the fixing element 48 engages the protuberance 40 in an interlocking manner. Each fixing element 48 is of a size which is too large to fit through a fixing aperture 44.

Following application of the sealing washer 47 and engagement of the fixing element 48 in the manner described above, a clamping element 52 is then fitted over the fixing element 48. The clamping element 52 may take various forms, but in the arrangement illustrated in FIG. 7 is generally cup-shaped. The clamping element 52 has a central aperture which is sized to fit over the threaded stud 50 of the fixing element 48 as illustrated. Finally, a threaded nut 53 is threadedly engaged with the threaded stud 50, and is drawn tight against the clamping element 52 as illustrated in FIG. 7, thereby urging the clamping element 52 towards the outer wall 28 of the combustor 24 and into tight engagement against the sealing washer 47, and thus securely fixing the liner element 30 to the combustor's outer wall 28.

Figure 8:
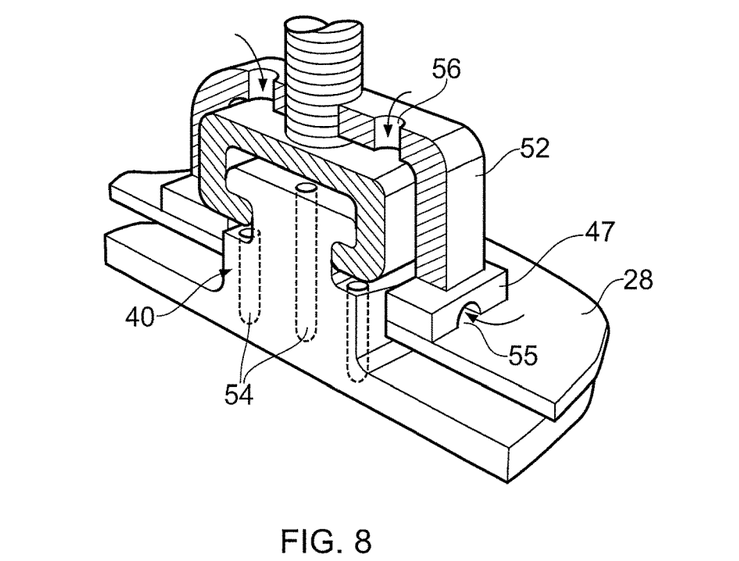
FIG. 8 is a perspective cross-sectional view through a corresponding region of a liner element in accordance with another embodiment.

FIG. 8 illustrates a slightly modified version of the general fixing arrangement described above, in which the protuberance 40, the sealing washer 47 and the clamping element 52 are provided with respective cooling airflow passages 54, 55, 56. Whilst it is envisaged that wherever possible the protuberances 40 and the above-described additional fixing components will be positioned in relative cool regions of the engine's combustor 24, this is not always possible to achieve and so the cooling airflow passages 54, 55, 56 will permit the flow of cooling air through their respective component parts and thus the fixing arrangement as a whole, thereby providing additional cooling to the arrangement where required.

Because the protuberances 40 are each configured for engagement by a respective fixing element 48 on the opposite side of the combustor outer wall 28, rather than being externally threaded for direct engagement by a nut, they can be configured to be significantly shorter than the externally threaded studs 7 used in the prior art IE tiles. This is because the protuberances 40 do not need to project through the fixing apertures 46 as far as the externally threaded studs of the prior art.

Figure 9:
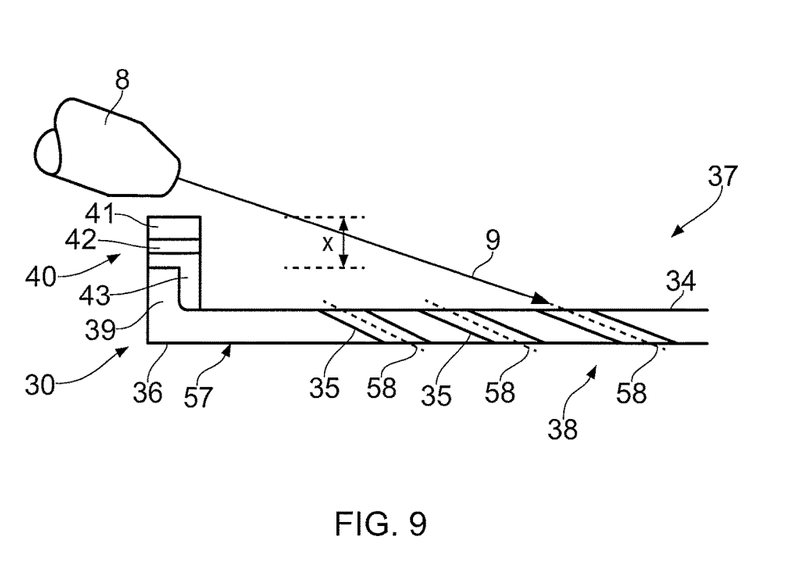
FIG. 9 is a cross-sectional view similar to that of FIG. 1, but which shows part of a liner element in accordance with the present invention being subjected to a cleaning step to clean the element's effusion holes.

The lower profile of the protuberances 40, in comparison to the externally threaded studs 7 of the prior art, is shown most clearly in FIG. 9. It is envisaged that the peripheral protuberances 40 around the flange 39 may be configured such that they protrude from the flange by a distance x of only 2 to 8 mm, and optionally approximately 5 mm. The shorter configuration of the protuberances offers a significant advantage when applying a thermal barrier coating to the combustion side surface 36 of the liner element 30 by the so-called "drill-coat-clean" method described above, as will now be explained below.

FIG. 9 depicts the liner element 30 after it has had a thermal barrier coating 57 applied to its combustion side surface 36, which may be achieved by any convenient known process such as air plasma spraying. As will be appreciated from the foregoing, it is thus necessary then to clean the effusion holes 35 to remove any coating material that may have become deposited within the effusion holes during the coating step and which may thus block the holes. This is achieved by a cleaning step which uses a similar jetting process to that described above in connection with the prior art, and FIG. 9 thus illustrates a jet nozzle 8 positioned on the cooling side 37 of the liner element 30 and which is oriented to direct a jet of cleaning water or air along a jet axis 9 towards and through the effusion holes 35 from the cooling side 37 of the liner element. As will be noted, the nozzle 8 is oriented so that the jet axis 9 is substantially parallel to the axes 58 of the flow channels defined by the effusion holes 35. The nozzle 8 will be moved across the cooling side 37 of the liner element 30 in spaced relation to the cooling side surface 34, in order to direct the jet through all, or as many as possible, of the effusion holes 35.

Because of the protuberance 40 protruding from the cooling side 37 of the liner element 30 are relatively short as explained above, and hence have a low profile as viewed in cross-section in FIG. 8, the nozzle 8 can be moved across the cooling side 37 of the liner element in this manner at a much closer spacing from the cooling side surface 34 than in the case of the prior art, without being obstructed by the protuberances 40. In particular, with the protuberances 40 configured as described above, the nozzle can be maintained at a distance of less than or equal to 30 mm from the cooling side surface 34 as measured along the jet axis 9 throughout the cleaning procedure and without fouling or clashing with the protuberances 40. The closer range of the cleaning nozzle 8 thus permits significantly improved cleaning of the effusion holes 35.

Furthermore, the shorter configuration of the protuberances also means that there will be fewer effusion holes 35 proximate the protuberances which fall into the "shadow" of the protuberances 40 (such as the leftmost effusion holes shown in FIG. 9) and which cannot be targeted so effectively by the cleaning jet. Nevertheless there may still remain some effusion holes 35 proximate the protuberances 40 which may not be conveniently targeted by the cleaning jet in the orientation illustrated, and so it is proposed that some of these effusion holes could be made larger than other more easily targeted holes distal to the protuberances 40, thereby permitting more variation in the jetting angle used to clean the holes in these regions, and also reducing the likelihood of the thermal barrier coating material completely blocking them.

In the case that the liner elements 30 are made via an additive layer manufacturing technique such as direct laser deposition, then the effusion holes 35 will be formed simultaneously with the rest of the liner element. In the case that the liner elements 30 are cast, then of course the effusion holes will need to be drilled before the thermal barrier coating is applied.

In the case of the liner elements 30 being made by an additive layer manufacturing method then the shorter length of the protuberances 40 also permits more efficient production of the liner elements 30 because they permit a larger number of liner elements 30 to be formed simultaneously in a vertically stacked array, thereby obviating another problem associated with the prior art.

Whilst the invention has been described above with reference to specific embodiments, it is to be appreciated that various modifications can be made without departing from the scope of the present invention. For example, whilst the liner element 30 described above and shown in the drawings has only non-threaded protuberances 40 and no externally threaded studs 7 such as those of the prior art, embodiments are envisaged which could have a mixture of both. Having regard to FIG. 9, which shows the angled effusion holes 35 being arranged to direct a flow of air from the cooling side 37 to the combustion side 38 of the liner element and in a generally downstream direction with regard to the general fluid flow direction though a combustor, it will be appreciated that the liner element 30 could have conventional fixing studs 7 provided at its downstream end without adversely affecting the cleaning process as described above. It is therefore possible for the liner element 30 to have conventional threaded fixing studs 7 along its downstream edge, but non-threaded protuberances 40 of the type described herein elsewhere. As will be appreciated, however, given the problems described above in relation to forming conventional fixing studs 7 by a direct laser deposition process, it is envisaged that a liner element 30 of this configuration would be cast.

When used in this specification and claims, the terms "comprises" and "comprising" and variations thereof mean that the specified features, steps or integers are included. The terms are not to be interpreted to exclude the presence of other features, steps or integers.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

The exemplary embodiments of the invention set forth above are considered to be illustrative and not limiting. Various changes to the described embodiments may be made without departing from the scope of the invention as defined in the accompanying claims.

The invention claimed is:

1. A liner element for a gas turbine combustor having a structural wall with fixing apertures provided through the structural wall, the liner element having a unitary construction defining a cooling side and combustion side, and a plurality of effusion holes extending between a cooling side surface of the liner element and a combustion side surface of the liner element; the liner element being configured to be affixed to the structural wall with the cooling side surface of the liner element spaced from the structural wall to define a chamber between the cooling side surface and the structural wall and having a flange around a periphery of the liner element configured to engage the structural wall when the liner element is affixed to the structural wall, wherein the liner element further includes integrally formed and non-threaded protuberances on the cooling side, each of the protuberances being arranged to engage and extend through a respective fixing aperture of the fixing apertures in the structural wall and at least some of said protuberances projecting from said flange; and one or more fixing elements, each fixing element configured to mechanically engage a respective protuberance of the protuberances in an interlocking manner.

2. The liner element provided in combination with a plurality of fixing elements according to claim 1, wherein each fixing element of the plurality of fixing elements defines a recess which is shaped to slidingly receive a correspondingly shaped part of the respective protuberance.

3. The liner element provided in combination with a plurality of fixing elements according to claim 1, wherein each fixing element of the plurality of fixing elements has an integrally formed threaded stud extending therefrom.

4. The liner element provided in combination with a plurality of fixing elements according to claim 1, wherein each fixing element of the plurality of fixing elements is of a size which will not pass through said fixing apertures.

5. The liner element according to claim 1 provided in combination with the gas turbine combustor having the structural wall with fixing apertures provided through the structural wall, wherein the liner element is affixed to the structural wall using said fixing elements such that each of the protuberances extends through the respective fixing aperture of the fixing apertures in the structural wall from one side of the structural wall and is mechanically engaged by a respective fixing element arranged on the opposite side of the structural wall.

6. The liner element provided in combination with the gas turbine combustor according to claim 1 wherein each fixing element has an integrally formed threaded stud extending therefrom and further comprising a plurality of clamping elements, each clamping element being fitted over a respective fixing element and being urged towards the structural wall by a nut which threadedly engages the threaded stud of the fixing element.

7. The liner element according to claim 1, wherein each protuberance is provided in the form of a lug projecting from the cooling side of the liner element.

8. The liner element according to claim 1 wherein said protuberances projecting from the flange protrude by a distance of between 2 mm and 8 mm.

9. The liner element according to claim 8, wherein said protuberances projecting from the flange protrude by a distance of approximately 5 mm.

10. The liner element according to claim 1 having a centrally located web projecting from said cooling side surface the centrally located web supporting one of the protuberances.

11. The liner element according to claim 1, wherein said effusion holes define respective flow channels through the liner element having respective axes which are inclined relative to said combustion side surface.

12. The liner element according to claim 1, wherein some of said effusion holes are proximate to said protuberances and are larger than other effusion holes which are distal to said protuberances.

13. A method of thermally insulating the liner element according to claim 1, the method involving the steps of: coating the combustion side surface of the liner element with a thermal barrier material; and subsequently cleaning the effusion holes to remove any of said material deposited inside the holes during said coating step; wherein said cleaning step involves directing a jet along a jet axis and through said effusion holes from the cooling side of the liner element, said jet being produced by a nozzle which is moved across the cooling side of the liner element in spaced relation to the cooling side surface whilst the distance of said nozzle to said cooling side surface, measured along said jet axis, is maintained at less than or equal to 30 mm.

14. The method according to claim 13 used for thermally insulating the liner element, wherein said effusion holes define respective flow channels through the liner element and having respective axes which are inclined relative to said combustion side surface, wherein said jet axis is substantially parallel to axes of the flow channels defined by the effusion holes.

15. The method according to claim 13, wherein said cleaning step involves selecting the nozzle, sizing the or each protuberance so as not to interfere with the movement of the nozzle and moving said nozzle over at least one said protuberance.

16. A liner element provided in combination with a plurality of fixing elements for a gas turbine combustor having a structural wall with fixing apertures provided through the structural wall, the liner element having a unitary construction defining a cooling side and combustion side, and a plurality of effusion holes extending between a cooling side surface of the liner element and a combustion side surface of the liner element; the liner element being configured to be affixed to the structural wall with the cooling side surface of the liner element spaced from the structural wall to define a chamber between the cooling side surface and the structural wall and having a peripheral flange configured to engage the structural wall when the liner element is affixed to the structural wall, wherein the liner element further includes integrally formed and non-threaded protuberances on the cooling side, each of the protuberances being arranged to engage and extend through a respective fixing aperture of the fixing apertures in the structural wall and at least some of said protuberances projecting from said flange; each fixing element configured to mechanically engage a respective protuberance of the protuberances in an interlocking manner, and each fixing element of the plurality of fixing elements has an integrally formed threaded stud extending therefrom.

17. The liner element provided in combination with the plurality of fixing elements and the gas turbine combustor according to claim 16, further comprising a plurality of clamping elements, each clamping element being fitted over a respective fixing element and being urged towards the structural wall by a nut which threadedly engages the threaded stud of the respective fixing element.

* * * * *